United States Patent [19]

Ojima et al.

[11] Patent Number: 4,645,724

[45] Date of Patent: Feb. 24, 1987

[54] MAGNETIC RECORDING MEDIUM COMPRISING A SPECIFIC TYPE OF LUBRICANT

[75] Inventors: Kumiko Ojima; Tsunehide Naruse; Yukio Matsumoto, all of Mito, Japan

[73] Assignee: Victor Company of Japan, Japan

[21] Appl. No.: 740,336

[22] Filed: Jun. 3, 1985

[30] Foreign Application Priority Data

Jun. 7, 1984 [JP] Japan ................... 59-115483

[51] Int. Cl.$^4$ .............................. G11B 5/70
[52] U.S. Cl. .................... 428/695; 252/62.54; 427/128; 427/131; 428/425.9; 428/694; 428/900
[58] Field of Search ............ 428/694, 695, 900, 328, 428/329, 425.9; 427/128, 131; 252/62.54

[56] References Cited

U.S. PATENT DOCUMENTS

| | | | |
|---|---|---|---|
| 3,704,152 | 11/1972 | Hartmann et al. | 117/235 |
| 4,002,804 | 1/1977 | Akashi et al. | 428/539 |
| 4,411,966 | 10/1983 | Yamaguchi | 428/900 |
| 4,420,532 | 12/1983 | Yamaguchi | 428/900 |
| 4,465,737 | 8/1984 | Miyatuka | 428/695 |
| 4,518,656 | 5/1985 | Okita | 427/128 |

FOREIGN PATENT DOCUMENTS

| | | |
|---|---|---|
| 58-141440 | 8/1983 | Japan . |
| 58-158032 | 9/1983 | Japan . |
| 008135 | 1/1984 | Japan . |
| 008133 | 1/1984 | Japan . |
| 008130 | 1/1984 | Japan . |
| 008131 | 1/1984 | Japan . |
| 2125800A | 3/1984 | United Kingdom . |

OTHER PUBLICATIONS

CA 98(8):64542j "Magnetic Recording Material".
CA 98(8):64536k "Magnetic Recording Medium".

Primary Examiner—Ellis P. Robinson
Attorney, Agent, or Firm—Lowe, Price, Leblanc, Becker & Shur

[57] ABSTRACT

A magnetic recording medium of the type which comprises a non-magnetic substrate and a magnetic recording layer formed on the substrate. The magnetic recording layer is made of a dispersion of magnetic powder in a binder and a lubricant which is a reaction product of a monobasic fatty acid and a monohydric alcohol in a molar ratio of 1:0.3 to 1:0.8.

2 Claims, No Drawings

MAGNETIC RECORDING MEDIUM COMPRISING A SPECIFIC TYPE OF LUBRICANT

BACKGROUND OF THE INVENTION

1. Field of the Invention

This invention relates to the art of magnetic recording and more particularly, to magnetic recording mediums such as magnetic tapes, magnetic sheets, magnetic cards, magnetic disks or magnetic drums for use in video, computer and audio systems.

2. Description of the Prior Art

Magnetic tapes for use in magnetic recording and reproducing apparatus such as, for example, video tape recorders should have good traveling performance as well as good electromagnetic conversion characteristics because they are run at high speed while maintaining physical contact with a number of parts such as tape guides, magnetic heads and the like. More particularly, the tapes should have not only good smoothness, but also a small coefficient of dynamic friction in order to ensure smooth and stable runnability.

In particular, recent video tape recorders have functions of slow reproduction, frame-by-frame reproduction, fast reproduction, and the like, so that more improved runnability of the tape is demanded along with the durability of the magnetic layer.

In order to improve the runnability, it is usual to add lubricants to the magnetic layer. A great number of fatty acids, fatty acid esters and mixtures thereof are frequently employed as the lubricants for these purposes. These types of lubricants are described in a number of patents such as, for example, U.S. Pat. Nos. 3,704,152 and 4,002,804 and Japanese Laid-open Patent Application Nos. 58-141440 and 58-158032. However, when fatty acids alone are used as the lubricant, the durability at the time of the frame freezing operation is not so good. On the other hand, fatty acid esters tend to exude, causing blooming of the esters during storage.

The above-indicated Japanese Laid-open Patent Application No. 58-158032 describes magnetic recording mediums which make use of lubricants consisting of mixtures of fatty acids and fatty acids esters. Mentioned as such fatty acids are lauric acid, palmitic acid, myristic acid, stearic acid and the like, and as fatty acid esters, esters of monobasic fatty acids and monohydric alcohols such as ethyl stearate, butyl stearate, amyl stearate, butyl palmitate, butyl laurate and the like. This medium is stated as having improved durability and strength.

However, the Japanese Laid-open Patent Application No. 58-141440 describes lubricants which comprise mixtures of fatty acids and fatty acid esters, to which extreme-pressure agents are added. It is stated in this patent application that the extreme-pressure agents serve to improve wear resistance of a magnetic layer. The extreme-pressure agents mentioned are, for example, phosphorus compounds, sulfur compounds, halogen compounds, and organic metal compounds.

As will be appreciated from the above, mixtures of fatty acids and fatty acid esters are not considered to be satisfactory with regard to durability and/or wear resistance.

SUMMARY OF THE INVENTION

It is an object of the present invention to provide magnetic recording mediums which have improved runnability and durability.

It is another object of the invention to provide magnetic recording mediums which are highly resistant to wear under severe operation conditions of magnetic recording and reproducing systems.

It is a further object of the invention to provide magnetic recording mediums which comprise reaction products of monobasic fatty acids in excess amounts and monohydric alcohols as lubricants.

The present invention provides a magnetic recording medium which comprises a non-magnetic substrate and a magnetic recording layer comprising magnetic powder dispersed uniformly in a binder and formed on at least one surface of the substrate. The invention is characterized in that a reaction product of a monobasic fatty acid and a monohydric alcohol in a molar ratio of 1:0.3 to 1:0.8 is present, as a lubricant, in the magnetic layer.

DETAILED DESCRIPTION AND EMBODIMENTS OF THE INVENTION

The monobasic fatty acids are of the formula, RCOOH, in which R represents a saturated or unsaturated hydrocarbon group having from 8 to 18 carbon atoms. Examples of the fatty acids having saturated hydrocarbon groups include nonylic acid, capric acid, undecylic acid, lauric acid, tridecylic acid, myristic acid, pentadecylic acid, palmitic acid, heptadecylic acid, stearic acid, and nonadecanoic acid. Iso isomers of these fatty acids may also be used. Typical unsaturated fatty acids include undecylenic acid, oleic acid and the like. These fatty acids may be used singly or in combination. Preferably, stearic acid, oleic acid, palmitic acid, myristic acid and lauric acid are used.

The monohydric alcohols, which react with the monobasic fatty acids, are of the formula, R'OH, in which R' represents a saturated or unsaturated hydrocarbon group having from 3 to 18 carbon atoms. The saturated monohydric alcohols are, for example, propyl alcohol, butyl alcohol, amyl alcohol, hexyl alcohol, heptyl alcohol, octyl alcohol, capryl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, and stearyl alcohol. Isomers of these alcohols may be also used. The unsaturated alcohols include, for example, allyl alcohol, crotyl alcohol, propargyl alcohol, and the like. These alcohols may be used singly or in combination. Preferably, stearyl alcohol, isostearyl alcohol, lauryl alcohol, octyl alcohol, isooctyl alcohol and allyl alcohol are used.

In the practice of the invention, these monobasic fatty acids and monohydric alcohols are reacted in a specific molar ratio. The reaction is conducted under conditions of a temperature of from 160° to 220° C., for a time of several hours, e.g. from 2 to 5 hours, in the presence of an acid catalyst. The acid catalyst need not be any specific ones and includes, for example, sulfonic acids such as paratoluenesulfonic acid, naphthalenesulfonic acid and the like. In some cases, mineral acids such as sulfuric acid, nitric acid and the like may be used.

In the reaction, the molar ratio between the fatty acid and the alcohol should be in the range of from 1:0.3 to 1:0.8. If the molar ratio of the alcohol to the fatty acid is either less than 0.3, or larger than 0.8, improvements in still reproduction characteristic, coefficient of dynamic friction and chrominance S to N ratio do not become significant. Accordingly, the molar ratio should be from 1:0.3 to 1:0.8.

When the reaction is caused to proceed in the defined molar ratio, the resulting reaction product will contain an ester formed by reaction between the fatty acid and the alcohol used, the free fatty acid remaining unreacted, water form by the esterification reaction, and the catalyst used. The water and the catalyst are removed from the reaction product in the usual manner. For instance, the catalyst may be readily removed using a filter aid such as, for example, diatomaceous earth. Water may be eliminated by distillation. Thus, the remaining reaction product, substantially free of water, is considered to be a mixture of the ester and the free fatty acid. Surprisingly, when used as a lubricant, this reaction product is much superior to a mere mixture of a fatty acid ester and a free fatty acid as will be seen from examples and comparative examples appearing hereinafter. The reason for this is not known at the present state of our investigation, but some unexpected reaction may take place.

For the preparation of the reaction product of the invention, if fatty acids whose hydrocarbon group has 7 or less carbon atoms are used, a disadvantage is involved in that a recording medium using such reaction products tends to suffer so-called "cupping", so that durability is improved only slightly. On the other hand, when the number of carbon atoms in the hydrocarbon group exceeds 18, improvements of the lubricating property and the still reproduction characteristic are not so great. Likewise, when the number of carbon atoms in the monohydric alcohol is 2 or below, cupping starts to take place, so that the improvement of durability is only slight. When the number of carbon atoms in the monohydric alcohol is 19 or over, the lubricating property and the still reproduction characteristic are not improved so much.

The reaction product is generally used in an amount of 0.1 to 20 parts by weight, preferably 0.5 to 7 parts by weight, per 100 parts by weight of magnetic powder in the magnetic recording layer.

Magnetic materials useful in the present invention may be any materials ordinarily used for these purposes, typical of which are ferromagnetic iron oxides such as gamma-$Fe_2O_3$ and $Fe_3O_4$ with or without additional metals such as Co, Ni, Mn and the like, ferromagnetic metals such as Fe, Co, Ni and the like, and alloys thereof.

Binders for these magnetic materials are well known in the art, and a diversity of thermoplastic and thermosetting resins are conveniently used. Typical examples of the thermoplastic resins include vinyl chloride-vinyl acetate copolymers, vinyl chloride-vinylidene chloride copolymers, acrylic ester-styrene copolymers, methacrylic ester-styrene copolymers, acrylic ester-vinylidene chloride copolymers, methacrylic ester-vinylidene chloride copolymers, urethane elastomers, cellulose derivatives, vinyl chloride-vinyl acetate-vinyl alcohol terpolymers, and other synthetic resins. Examples of the thermosetting resins are phenolic resins, epoxy resins, alkyd resins, silicone resins, ureaformaldehyde resins, mixtures of isocyanates and polyols, and the like.

In accordance with the present invention, a dispersion of magnetic powder and the reaction product of the type described before in a dissolved resin is prepared by milling or other known techniques and applied to a suitable nonmagnetic support, which is in the form of a film, foil or sheet, followed by curing to form a magnetic layer on the support.

The magnetic layer may further comprise other additives such as dispersants, lubricants, abrasive agents, antistatic agents, and surfactants, if necessary.

The present invention is more particularly described by way of examples.

EXAMPLE 1

One hundred parts by weight of Co-containing gamma-$Fe_2O_3$ as a magnetic powder, 15 parts by weight of vinyl chloride-vinyl acetate copolymer, 8 parts by weight of carbon black, 1 part by weight of lecithin as a dispersant, 230 parts by weight of a mixed solvent of methyl ethyl ketone and methyl isobutyl ketone in equal amounts, and 2 parts by weight of a reaction product, as a lubricant, which was obtained by reaction between pelargonic acid ($C_8H_{17}COOH$) having a linear alkyl group with 8 carbon atoms and n-propyl alcohol ($C_3H_7OH$) in a molar ratio of 1:0.3 were mixed in a sand mill for about 40 hours. Thereafter, 5 parts by weight of an isocyanate curing agent (Coronate L, by Nippon Polyurethane Co., Ltd.) was added to the mixture and agitated to obtain a magnetic paint. The magnetic paint was applied onto a polyester film while applying a magnetic field to cause the magnetic powder to be oriented in the same direction, followed by drying, calendering and curing as usual, thereby obtaining a magnetic tape having a 5 μm thick magnetic layer.

EXAMPLE 2

The general procedure of Example 1 was repeated using a reaction product obtained by reaction between undecylic acid and decyl alcohol in a molar ratio of 1:0.4, thereby obtaining a magnetic tape.

EXAMPLE 3

The general procedure of Example 1 was repeated using a reaction product which was obtained by reaction between pelargonic acid and cetyl alcohol in a molar ratio of 1:0.5, thereby obtaining a magnetic tape.

EXAMPLE 4

The general procedure of Example 1 was repeated using a reaction product which was obtained by reaction between palmitic acid and hexyl alcohol in a molar ratio of 1:0.5, thereby obtaining a magnetic tape.

EXAMPLE 5

The general procedure of Example 1 was repeated using a reaction product which was obtained by reaction between pentadecylic acid and decyl alcohol in a molar ratio of 1:0.6, thereby obtaining a magnetic tape.

EXAMPLE 6

The general procedure of Example 1 was repeated using a reaction product which was obtained by reaction between tridecylic acid and pentadecyl alcohol in a molar ratio of 1:0.6, thereby obtaining a magnetic tape.

EXAMPLE 7

The general procedure of Example 1 was repeated using a reaction product which was obtained by reaction between nonadecanoic acid and propyl alcohol in a molar ratio of 1:0.7, thereby obtaining a magnetic tape.

EXAMPLE 8

The general procedure of Example 1 was repeated using a reaction product which was obtained by reaction between heptadecylic acid and decyl alcohol in a molar ratio of 1:0.8, thereby obtaining a magnetic tape.

EXAMPLE 9

The general procedure of Example 1 was repeated using a reaction product which was obtained by reaction between nonadecanoic acid and stearyl alcohol in a molar ratio of 1:0.8, thereby obtaining a magnetic tape.

COMPARATIVE EXAMPLES 1 THROUGH 9

The general procedures of Examples 1 through 9 were, respectively, repeated using esters of equimolar amounts of monobasic fatty acids and monohydric alcohols used in the respective examples, thereby obtaining magnetic tapes.

COMPARATIVE EXAMPLES 11 THROUGH 19

The general procedures of Examples 1 through 9 were, respectively, repeated using mixtures of the fatty acid esters used, respectively, in Comparative Examples 1 through 9 and the fatty acids used for the preparation of the fatty acid esters in Comparative Examples 1 through 9, thereby obtaining magnetic tapes. The mixing ratio between a fatty acid ester and a fatty acid in each comparative example was determined such that the molar ratio between the total of the fatty acid components and the alcohol component was equal to the molar ratio of a fatty acid and an alcohol in a corresponding example, e.g. a molar ratio of the fatty acid ester/the fatty acid was 3/7 in Comparative Example 11, and 1/1 in Comparative Examples 13, 14.

COMPARATIVE EXAMPLES 21 THROUGH 27

The general procedure of Example 1 was repeated using fatty acids indicated in Table 4, thereby obtaining magnetic tapes.

The magnetic tapes obtained in Examples and Comparative Examples were subjected to measurements of an electromagnetic conversion characteristic, i.e. chrominance S/N value, runnability, i.e. coefficient of dynamic friction, and durability, i.e. still reproduction time. The chrominance S/N was determined as follows: each tape was mounted in a recording and reproducing apparatus of HR-2200, by Victor Company, of Japan in which a signal of 629 MHz was recorded and reproduced, followed by comparing the S/N value of the reproduction signal with an S/N value of a standard tape. The coefficient of dynamic friction was determined as follows: each tape was wound around the half of a stainless steel pin having a diameter of 6 mm and run at a practical speed for a video recorder; and the tension exerted on the take by contact with the pin at the lead-in side was measured as $T_1$ and the tension at the lead-out side was measured as $T_2$, and the coefficient was then determined as $1/\pi \ln(T_2/T_1)$. The still reproduction time was determined as a time before a lowering of output signal was within 6 dB when each tape was subjected to continuous still reproduction.

The results are shown in Table 1 through 4 below.

TABLE 1

| Ex. No. | Lubricant (Fatty Acid Partial Ester) Number of C in R | Number of C in R' | RCOOH:R'OH | Still Reproduction characteristic (minutes) | Coefficient of Kinetic friction | Chrominance S/N (dB) |
|---|---|---|---|---|---|---|
| 1 | 8 | 3 | 1:0.3 | 140 | 0.11 | +2.9 |
| 2 | 10 | 10 | 1:0.4 | 150 | 0.11 | +3.1 |
| 3 | 8 | 16 | 1:0.5 | 140 | 0.10 | +3.0 |
| 4 | 15 | 6 | 1:0.5 | 150 | 0.09 | +3.3 |
| 5 | 14 | 10 | 1:0.6 | 150 | 0.11 | +3.2 |
| 6 | 12 | 15 | 1:0.6 | 160 | 0.12 | +3.1 |
| 7 | 18 | 3 | 1:0.7 | 140 | 0.11 | +3.0 |
| 8 | 16 | 10 | 1:0.8 | 150 | 0.12 | +3.3 |
| 9 | 18 | 18 | 1:0.8 | 160 | 0.13 | +3.0 |

TABLE 2

| Comp. Ex. No. | Lubricant (Fatty Acid Ester) | Still Reproduction characteristic (minutes) | Coefficient of Kinetic friction | Chrominance S/N (dB) |
|---|---|---|---|---|
| 1 | $C_8H_{17}COOC_3H_7$ | 100 | 0.13 | +2.6 |
| 2 | $C_{10}H_{21}COOC_{10}H_{21}$ | 130 | 0.13 | +2.7 |
| 3 | $C_8H_{17}COOC_{16}H_{33}$ | 110 | 0.14 | +2.7 |
| 4 | $C_{15}H_{31}COOC_6H_{13}$ | 120 | 0.12 | +2.9 |
| 5 | $C_{14}H_{29}COOC_{10}H_{21}$ | 100 | 0.12 | +2.6 |
| 6 | $C_{12}H_{25}COOC_{15}H_{31}$ | 90 | 0.15 | +2.7 |
| 7 | $C_{18}H_{37}COOC_3H_7$ | 100 | 0.15 | +2.6 |
| 8 | $C_{16}H_{33}COOC_{10}H_{21}$ | 110 | 0.16 | +2.8 |
| 9 | $C_{18}H_{37}COOC_{18}H_{37}$ | 90 | 0.15 | +2.7 |

TABLE 3

| Comp. Ex. No. | Lubricant (Fatty Acid Ester + Free Fatty Acid) | Still Reproduction characteristic (minutes) | Coefficient of Kinetic friction | Chrominance S/N (dB) |
|---|---|---|---|---|
| 11 | $C_8H_{17}COOC_3H_7$ + $C_8H_{17}COOH$ | 80 | 0.12 | +2.8 |
| 12 | $C_{10}H_{21}COOC_{10}H_{21}$ + $C_{10}H_{21}COOH$ | 90 | 0.14 | +2.5 |
| 13 | $C_8H_{17}COOC_{16}H_{33}$ + $C_8H_{17}COOH$ | 70 | 0.12 | +2.7 |
| 14 | $C_{15}H_{31}COOC_6H_{13}$ + $C_{15}H_{31}COOH$ | 110 | 0.15 | +2.6 |
| 15 | $C_{14}H_{29}COOC_{10}H_{21}$ + $C_{14}H_{29}COOH$ | 90 | 0.14 | +2.8 |
| 16 | $C_{12}H_{25}COOC_{15}H_{31}$ + $C_{12}H_{25}COOH$ | 90 | 0.13 | +2.7 |
| 17 | $C_{18}H_{37}COOC_3H_7$ + $C_{18}H_{37}COOH$ | 100 | 0.14 | +2.6 |
| 18 | $C_{16}H_{33}COOC_{10}H_{21}$ + $C_{16}H_{33}COOH$ | 90 | 0.15 | +2.7 |
| 19 | $C_{18}H_{37}COOC_{18}H_{37}$ + $C_{18}H_{37}COOH$ | 100 | 0.16 | +2.4 |

TABLE 4

| Comp. Ex. No. | Lubricant (Fatty Acid) | Still Reproduction characteristic (minutes) | Coefficient of Kinetic friction | chrominance S/N (dB) |
|---|---|---|---|---|
| 21 | $C_8H_{17}COOH$ | 60 | 0.14 | +2.4 |
| 22 | $C_{10}H_{21}COOH$ | 80 | 0.15 | +2.6 |
| 23 | $C_{12}H_{25}COOH$ | 90 | 0.16 | +2.7 |
| 24 | $C_{14}H_{29}COOH$ | 60 | 0.13 | +2.5 |
| 25 | $C_{15}H_{31}COOH$ | 80 | 0.14 | +2.5 |
| 26 | $C_{16}H_{33}COOH$ | 90 | 0.17 | +2.6 |
| 27 | $C_{18}H_{37}COOH$ | 80 | 0.16 | +2.5 |

As will be clear from the results of Tables 1 through 4, the travelling performance, durability, and magnetic characteristic of the mediums according to the invention are all superior to the mediums for comparison, in which the fatty acid esters, the mixtures of the fatty acid esters and free fatty acids, and the free fatty acids are used as the lubricant. Thus, the speific type of reaction product is considered to be more effective as the lubricant for magnetic recording mediums.

What is claimed is:

1. A magnetic recording medium which comprises a non-magnetic substrate and a magnetic recording layer made of a uniform dispersion of magnetic powder in a binder and formed on at least one surface of said substrate, said dispersion comprising, as a lubricant, a reaction product of a monobasic fatty acid and a monohydric alcohol reacted in a molar ratio of 1:0.3 to 1:0.8, said reaction product being substantially free of water, and being the reaction product of a fatty acid of the formula, RCOOH, in which R is a hydrocarbon group having from 8 to 18 carbon atoms, and a monohydric alcohol of the formula, R'OH, in which R' represents a hydrocarbon group having from 3 to 18 carbon atoms.

2. A magnetic recording medium according to claim 1, wherein the reaction product is used in an amount of from 0.1 to 20 parts by weight per 100 parts of the magnetic powder.

* * * * *